United States Patent [19] [11] 3,888,335
Hanke [45] June 10, 1975

[54] HYDRODYNAMIC RETARDER FOR VEHICLES, ESPECIALLY FOR MOTOR VEHICLES

[75] Inventor: Hans Hanke, Stuttgart, Germany
[73] Assignee: Daimler-Benz Aktiengesellschaft, Germany
[22] Filed: Dec. 7, 1973
[21] Appl. No.: 422,651

[30] Foreign Application Priority Data
Dec. 8, 1972 Germany............................ 2260141

[52] U.S. Cl. ..................... 188/290; 60/337; 60/339; 188/296; 188/264 B; 188/264 E; 192/3.34; 192/113 B
[51] Int. Cl. ............................................ F16d 57/02
[58] Field of Search .... 188/290, 296, 264 B, 264 E; 60/337, 339, 347; 192/3.34, .23, 113 B

[56] References Cited
UNITED STATES PATENTS
| | | | |
|---|---|---|---|
| 2,864,473 | 12/1958 | Christenson et al. | 188/296 X |
| 3,139,158 | 6/1964 | Sieving | 188/296 |
| 3,774,735 | 11/1973 | Hanke et al. | 188/296 |

Primary Examiner—George E. A. Halvosa
Attorney, Agent, or Firm—Craig & Antonelli

[57] ABSTRACT
A hydrodynamic retarder for vehicles, especially for motor vehicles which includes an internal working circulation between at least one rotating and at least one fixed blade wheel. An external cooling circulatory system with a by-pass valve actuatable by the pressure in the system is provided with a filling cylinder being connected with the external cooling circulatory system by way of a filling and discharge line and controlled by way of a control valve, for example, from the brake pedal. A reservoir tank is coordinated to the external cooling circulatory system and a pressure relief of the spaces disposed directly in front of the shaft seals in the direction toward a place of the working circulation which is pressureless during operation. A first spring-loaded valve especially a disk valve is coordinated to the filling cylinder which, during a braking operation closes the connection between the filling and discharge line and the reservoir tank but opens the connection of the filling and discharge line to the filling cylinder and which during idling operation opens up the connection between filling cylinder, reservoir tank and filling and discharge line. The system additionally includes a lubricating line between the pressure-relieved spaces and the filling and discharge line which includes a second spring-loaded valve, especially a disk valve that closes during braking operation but opens up the connection between lubricating line and filling and discharge line during the idling operation.

22 Claims, 4 Drawing Figures

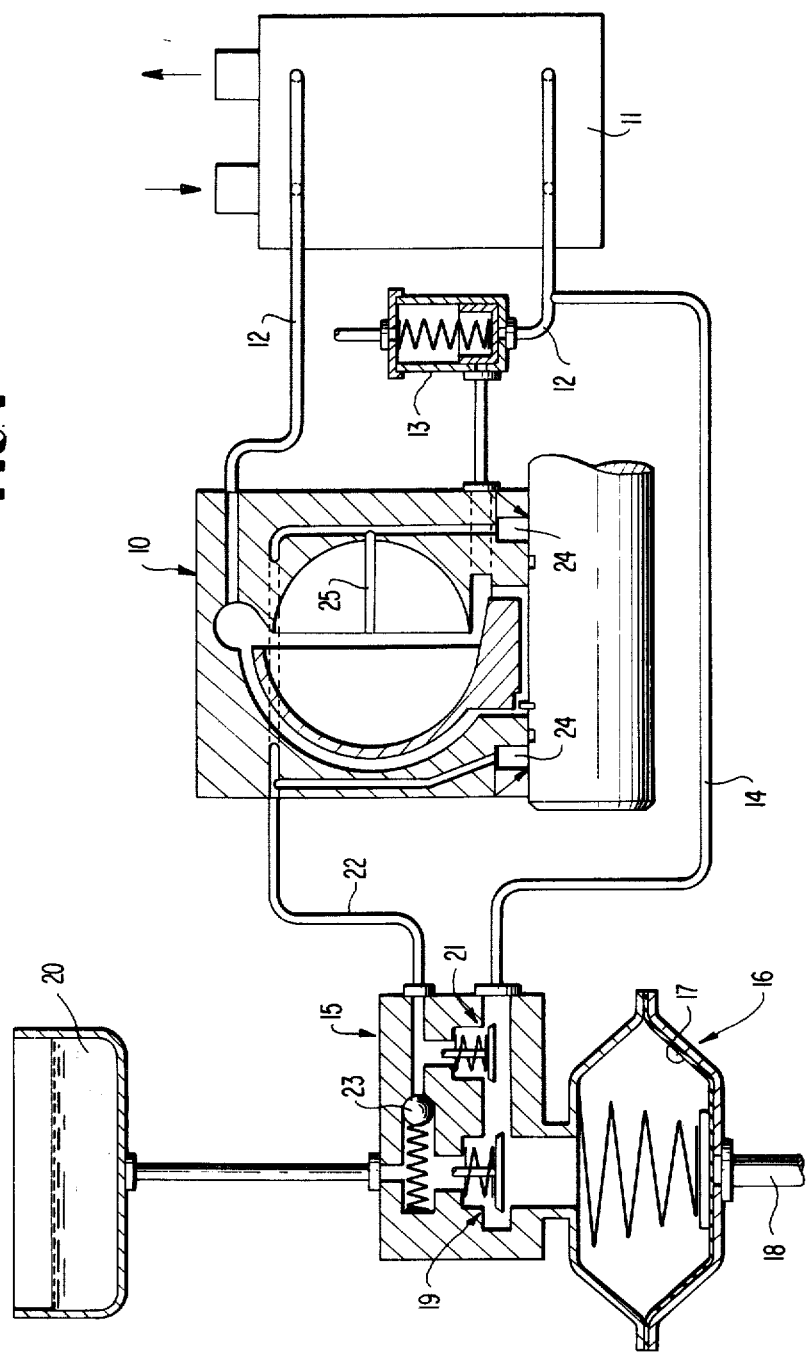

PATENTED JUN 10 1975 3,889,335

SHEET 2

HYDRODYNAMIC RETARDER FOR VEHICLES, ESPECIALLY FOR MOTOR VEHICLES

The present invention relates to a hydrodynamic retarder for vehicles, especially for motor vehicles, with an internal working circulatory system between at least one rotating and at least one fixed blade wheel within a working space, with a cooling circulatory system, with a by-pass valve adapted to be actuated by the pressure in the cooling circulatory system and possibly with a cooler, with a filling cylinder controlled by means of a control valve, for example, by the brake pedal and connected with the external cooling circulatory system by way of a filling and discharge line, with a reservoir tank also coordinated to the external circulatory system and with a pressure relief of the spaces disposed directly in front of the shaft seals toward a place of the working circulatory system which is pressureless during operation.

A retarder of the type described above has already been proposed by the assignee of the instant application in U.S. Pat. No. 3,774,735. The present invention is now concerned with the task to still further improve such a retarder in its operation and especially to simplify its construction. Above all other things, a completely satisfactory lubrication is thereby to be assured during the idling operation and additionally also the fact that the control system can satisfy, in addition to the normal operating conditions, also the following two operating conditions:

1. Full air pressure on the filling cylinder when the retarder stands still or rotates slowly; and
2. Emptying of the working space during the starting and sudden acceleration of the engine with a retarder that has run full during standstill.

The underlying problems are solved in accordance with the present invention with the retarders of the type described above in that a first spring-loaded valve, especially a plate or disk valve, is coordinated to the filling cylinder which first valve during the braking operation closes the connection between the filling and discharge line and the reservoir tank but leaves open the connection of the filling and discharge line to the filling cylinder and which during idling operation opens up the connection between the filling cylinder, the reservoir tank, and the filling and discharge line, and in that additionally a lubricating line is provided between the pressure-relieved spaces at the seals and the filling and discharge line which includes a second spring-loaded valve, especially a plate or disk valve that closes during the braking operation but opens this connection during the idling operation.

As a result of this construction and arrangement in accordance with the present invention, a completely satisfactory operation is assured during braking and during idling. The filling cylinder is acted upon with compressed air during braking from the brake valve so that the two plate valves can then close. These plate valves are of particular advantage for the present invention by reason of their low friction and their high response sensitivity. The filling liquid then flows through the filling and discharge line into the working space of the retarder. Depending on the air pressure, a variable filling of the brake and therewith an adjustable braking moment is attained. The leakage oil which escapes during the braking operation through the piston ring seal, is returned into the center of the working space by way of the relief connection. With a relieved filling cylinder, both disk valves open. The retarder can then pump itself empty into the filling cylinder or reservoir tank by way of the filling and discharge line. The by-pass valve assures that the cooling circulatory system is not completely emptied. This measure in conjunction with the correct selection of the two disk valves assures short response periods both during the filling as also during the emptying of the retarder. It is additionally proposed by the present invention that the lubricating line be connected with the reservoir tank by way of a check valve, which connects the lubricating line with the reservoir tank when a predetermined pressure in the lubricating line is exceeded but which always closes in the opposite direction. With the aid of this check valve, the operating condition described hereinabove under paragraph 1 is controlled; for an overloading of the seals is prevented thereby. The excess oil can therefore flow back into the storage tank by way of the check valve.

The lubricating problem during the idling operation is solved with the aid of the second disk valve. It represents, so to speak of, a by-pass of the check valve and opens the connection to the reservoir tank which is appropriately arranged above the retarder. With correspondingly high rotational speeds, the spaces in front of the seals would be emptied by reason of the pumping action of the rotor without these connecting lines to the reservoir tank and a vacuum would be built up thereat at the same time. A corresponding lubricating fluid can then flow in through the opened second disk valve.

The retarder according to the present invention is characterized additionally by such an arrangement and construction of the two disk valves that the two disks thereof are disposed transversely to the impinging flow from the filling cylinder into the filling and discharge line but are disposed approximately parallel to the reverse flow direction. As a result of this particular arrangement, which is of great importance especially for the first disk valve, the operating condition described hereinabove under paragraph 2 is controlled. This arrangement, in particular, assures that the first disk valve cannot close toward the storage tank even with a large oil surge in the direction "emptying". Nonetheless, the minimum air pressure possible from the brake valve already assures a safe closing so that a filling of the retarder can take place. Also, the second disk valve then closes against the lubricating circulatory system.

The present invention can be further refined in that the two plate or disk valves and the check valve are combined into a single valve block and in that the two disk valves are arranged in this valve block parallel to one another and the check valve is arranged between the two disk valves approximately at right angle thereto. It is then proposed in connection therewith that the filling and discharge line is so introduced into the valve block that it terminates also with a closed first disk valve at least with a predominant portion thereof above the disk of the first disk valve. The connecting spaces to the filling cylinder can be extended in both disk valves according to the present invention by means of lateral pockets above the valve seats thereof and in the first disk valve the filling and discharge line may then terminate in this upwardly extended portion. It has already been mentioned that as a result of this construction the closing, above all of the first disk valve, is avoided during the occurrence of a sudden surge out of the filling-discharge line.

It is additionally proposed by the present invention that the valve seat at the first disk valve be constructed as a cylindrical pipe insert which is provided opposite its seat, with lateral apertures into an annular housing space which, in its turn, intersects the space of the check valve accommodating the spring. With respect to the second disk valve, it is proposed that the valve seat also be constructed thereat as a cylindrical pipe insert which is provided opposite its seat with lateral apertures into an annular space which, in its turn, is connected with the space below or downstream of the ball of the check valve and the lubricating line.

Finally, it is also proposed by the present invention that the valve block is coordinated directly to the filling cylinder or is formed itself by a housing part thereof. An extraordinarily space-saving arrangement is attained in this manner. If reference is made so far of a filling cylinder, then such reference contemplates in the first instance a storage device approximately in the manner of a diaphragm accumulator. Such a diaphragm accumulator may consist, for example, of two conical half-shells which accommodate therebetween the elastic diaphragm. The pressure air line leading to the brake valve is then connected to one half shell whereas the other half shell forms directly with the central portion thereof of the valve block. It is possible in this manner to so arrange the two disk valves in a very simple manner that they are acted upon directly by the outflowing fluid during response of the filling cylinder or storage device.

Accordingly, it is an object of the present invention to provide a hydrodynamic retarder for vehicles, especially for motor vehicles, which avoids by simple means the aforementioned shortcomings and drawbacks encountered in the prior art.

Another object of the present invention resides in a hydrodynamic retarder for vehicles whose efficiency is further improved, coupled with simplification in its construction.

A further object of the present invention resides in a hydrodynamic retarder system for motor vehicles which assures a completely satisfactory lubrication during idling operation.

Still another object of the present invention resides in a control system for a hydrodynamic retarder of the type described above which, in addition to controlling the normal operating conditions, is able to control also the operating conditions as regards full air pressure on the filling cylinder when the retarder is standing still or rotates slowly and as regards emptying of the working space during starting or sudden acceleration of the engine after the retarder has filled itself during standstill.

A still further object of the present invention resides in a hydrodynamic retarder for motor vehicles which assures a completely satisfactory operation during braking and idling and ensures that the cooling circulatory system is not completely emptied.

Another object of the present invention resides in a hydrodynamic retarder system for motor vehicles which offers short response periods during filling as well as during emptying of the retarder and effectively prevents an overloading of shaft seals.

These and other objects, features, and advantages of the present invention will become more apparent from the following description when taken in connection with the accompanying drawing which shows, for purposes of illustration only, one embodiment in accordance with the present invention, and wherein:

FIG. 1 is a schematic view of a retarder with its control system in accordance with the present invention;

FIG. 3 is a cross-sectional view, on an enlarged scale, taken along line III—III of FIG. 2a.

Figure 2A:
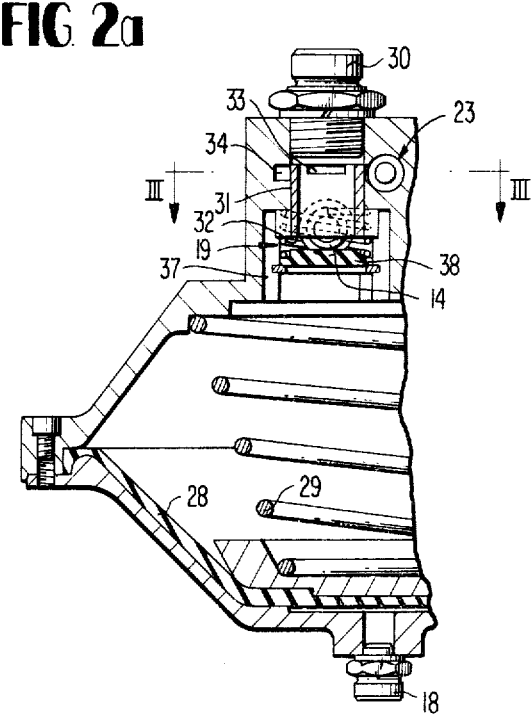
FIGS. 2a and 2b are partial cross sectional views through one half of the accumulator together with the valve block in accordance with the present invention shown in FIG. 2a when the brake is not actuated and in FIG. 2b when the brake is actuated.

Referring now to the drawing wherein like reference numerals are used throughout the various views to designate like parts, and more particularly to FIG. 1, according to this FIG., the retarder generally designated by reference numeral 10 together with a cooler 11 forms an external circulatory system 12 into which is interconnected a by-pass valve 13. The by-pass valve 13 is actuated against the force of a spring by the pressure in the external circulation 12. A filling and discharge line 14 extends from this external circulation 12 to a storage or accumulator device generally designated by reference numeral 16 by way of a valve block generally designated by reference numeral 15. The storage device 6 is constructed as diaphragm accumulator whose diaphragm 17 can be actuated by the pressure at the brake valve (not shown) by way of the line 18.

A first plate or disk valve generally designated by reference numeral 19 is provided in the valve block 15 which controls the connection between the storage device 16 and a reservoir tank 20 which is arranged spatially above the retarder 10. A second plate or disk valve generally designated by reference numeral 21 serves for the connection of the storage device 16 with a lubricating line 22 which is closed off with respect to the storage tank 20 by way of the check valve 23. This lubricating line 22 terminates in the spaces generally designated by reference numeral 24 of the retarder 10 which are disposed adjacent the shaft seals, and it is additionally relieved toward the pressureless interior of the retarder 10 by way of a tap line 25. In the illustrated condition, the reservoir device 16 is completely filled, the retarder 10 is empty and the cooler 11 is also still filled. If now the brake valve is actuated either for purposes of testing or accidentally, for example, while the retarder 10 is standing still, then the retarder 10 is filled from the reservoir device 16 by way of the filling and discharge line 14. The pressure which builds up thereat and which consequently also loads the seals, is carried off and removed out of the spaces 24 by way of the lubricating line 22 and the now opening check valve 23 toward the reservoir tank 20 so that the seals cannot be damaged.

If now after a longer standstill of the vehicle, i.e., from the illustrated starting condition, the retarder should have run full, i.e., has filled up by way of the disk valves 19 and 21 and by way of the lubricating line 22, then a relatively large surge of oil will flow during the starting or when giving gas for purposes of acceleration by way of the filling and discharge line 14 in the direction of "emptying." This quantity can flow off toward the reservoir tank 20 by way of the two disk valves 19 and 21. During idling operation, the lubrication takes place from the reservoir tank 20 by way of the lubricating line 22 and the two open valves 19 and 21. If, however, the brake is now actuated, then both disk valves 19 and 21 close immediately and the retarder 10 is now filled by way of the filling and discharge line 14. This filling action is accurately metered by means of the brake valve so that also a variable brake moment can be produced.

Figure 2B:
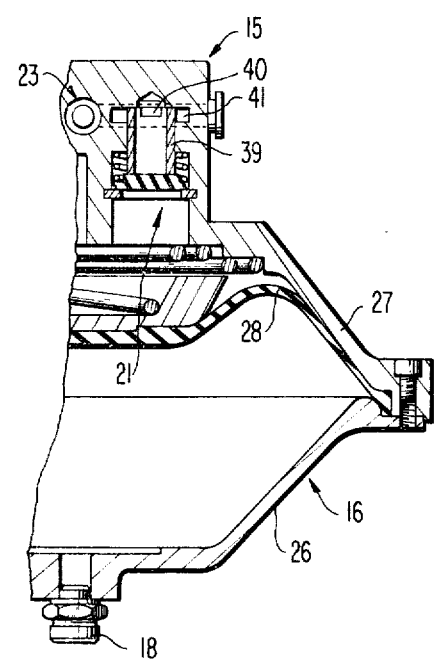
Figure 3:
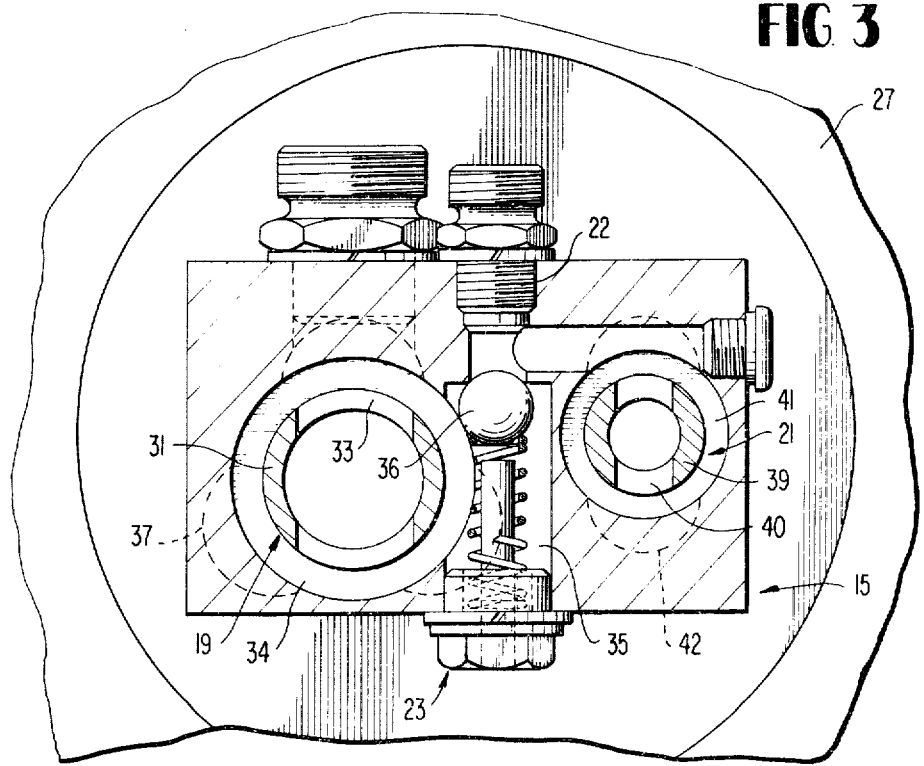

According to FIGS. 2a, 2b and 3, the storage device 16 consists of two conical half-shells 26 and 27 which accommodate therebetween a diaphragm 28. The pressure from the brake valve acts by way of the line 18 on this diaphragm 28 opposite a spring 29. The upper half-shell 27 receives in its central area the valve block 15 with the first disk valve 19, the second disk valve 21, and the check valve 23. The first and second disk valves 19 and 21 are disposed adjacent one another axially parallel to the storage device 16 whereas the check valve 23 is arranged transversely between the two disk valves 19 and 21. The line 30 leading to the reservoir tank 20 is connected to the first plate valve 19 at the top thereof. An insert bush 31 forms at the bottom the valve seat 32 (FIG. 2a) and is provided at the top with two cut-outs 33 (FIGS. 2a and 3) which terminate in an annular space 34 which intersects the space 35 (FIG. 3) in front of the ball 36 of the check valve 23. In the first disk valve 19 three lateral pockets 37 are extended upwardly beyond the valve seat and the filling and discharge line 14 terminates in these lateral pockets 37 in the upper area thereof. The line 14 therefore lies in every case, i.e., also with a closed disk valve 19, at least predominantly above the valve disk 38.

The second disk valve 21 is constructed analogous to the first disk valve. Also, in the second disk valve 21, a valve insert 39 is provided at the top with cutouts 40 which terminate in an annular space 41, which, in its turn, is in communication with the lubricating line 22 or with the space behind the ball 36 of the check valve 23. Also, in the second disk valve 21, lateral pockets 42 are extended upwardly beyond the valve seat.

The operation of the valves was explained already by reference to FIG. 1. However, these FIGs. 2a, 2b and 3 also clearly show that the two disk valves 19 and 21 close immediately during the response of the storage device 16 and seal off in the direction towad the reservoir tank 20. On the other hand, it becomes clear from FIG. 2a that a surge flowing out of the filling and discharge line 14 opens in every case the first disk valve 19 so that also the reservoir tank can be utilized for the absorption of this surge.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changed and modifications are are encompassed by the scope of the appended claims.

What I claim is:

1. A hydrodynamic retarder for vehicles which includes an internal working circulatory system between at least one rotating blade wheel means and at least one stationary blade wheel means in a working space, an external cooling circulatory system, a by-pass valve in the external cooling circulatory system actuatable by the pressure thereof, a filling cylinder means operatively connected with the external cooling circulatory system by way of a filling and discharge line means, said filling cylinder means being selectively controlled by control valve means, a reservoir means operatively coordinated to the external cooling circulatory system, and pressure-relief means of the spaces disposed directly in front of shaft seals in the direction toward a place of the working circulatory system which is pressureless during operation, characterized in that a first spring-loaded disk valve means is operatively associated with the filling cylinder means, said first valve means being operable to close during a braking operation a connection between the filling and discharge line means and the reservoir means while opening a connection between the filling and discharge line means to the filling cylinder means, and said valve means being additionally operable to open the connection between the filling cylinder means, the reservoir means and the filling and discharge line means during idling operation, and in that additionally a lubricating line means is provided between the pressure relieved spaces at the seals and the filling and discharge line means, a second spring-loaded disk valve means being operatively connected in said lubricating line means, said second valve means being operable to close during a braking operation but opening up during idling operation the connection between the lubricating line means and the filling and discharge line means, the lulbricating line means is connected with the reservoir means by way of a check valve means, when the pressure in the lubricating line means exceeds a predetermined pressure but always closes in the opposite direction, and characterized by such an arrangement and construction of the two disk valve means that the two disks thereof are disposed substantially transversely to the impinging flow from the filling cylinder means into the filling and discharge line means but are disposed approximately parallel to the reverse flow direction.

2. A retarder according to claim 1, characterized in that the first and second valve means are disk valves.

3. A retarder according to claim 1, characterized in that the external cooling circulatory system includes a cooler means.

4. A retarder according to claim 1, characterized in that the control valve is actuated by a brake pedal.

5. A retarder according to claim 1, characterized in that the first and second disk valve means and the check valve means are combined into a single valve block and in that the first and second valve means are disposed substantially parallel to one another within the valve block while the check valve means is arranged in the valve block approximately at right angle thereto between the first and second valve means.

6. A retarder according to claim 5, characterized in that the filling and discharge line means is so connected with the valve block that it terminates, even with a closed first disk means, at least with a predominant portion thereof above the disk of the first disk valve means.

7. A retarder according to claim 1, characterized in that the first and second valve means and the check valve means are combined into a single valve block and in that the first and second valve means are disposed substantially parallel to one another within the valve block while the check valve means is arranged in the valve block approximately at right angle thereto between the first and second valve means.

8. A retarder according to claim 7, characterized in that the filling and discharge line means is so connected with the valve block that it terminates, even with a closed first disk means, at least with a predominant portion thereof above the disk of the first valve means.

9. A retarder according to claim 7, characterized in that the valve block is directly connected to the filling cylinder means.

10. A retarder according to claim 7, characterized in that the valve block is formed itself by a housing portion of the filling cylinder means.

11. A hydrodynamic retarder for vehicles which includes an internal working circulatory system between at least one rotating blade wheel means and at least one stationary blade wheel means in a working space, an external cooling circulatory system, a by-pass valve in the external cooling circulatory system actuatable by the pressure thereof, a filling cylinder means operatively connected with the external cooling circulatory system by way of a filling and discharge line means, said filling cylinder means being selectively controlled by a control valve, a reservoir means operatively coordinated to the external cooling circulatory system, and pressure-relief means of the spaces disposed directly in front of shaft seals in the direction toward a place of the working circulatory system which is pressureless during operation, characterized in that a first spring-loaded disk valve means is operatively associated with the filling cylinder means, said first valve means being operable to close during a braking operation a connection between the filling and discharge line means and the reservoir means while opening a connection between the filling and discharge line means to the filling cylinder means, and said first valve means being additionally operable to open the connection between the filling cylinder means, the reservoir means and the filling discharge line means during idling operation, and in that additionally a lubricating line means is provided between the pressure relieved spaces at the seals and the filling and discharge line means, a second spring-loaded disk valve means being operatively connected in said lubricating line means, said second valve means being operable to close during a braking operation but opening during idling operation the connection between the lubricating line means and the filling and discharge line means, the lubricating line means is connected with the reservoir means by way of a check valve means, when the pressure in the lubricating line means exceeds a predetermined pressure but always closes in the opposite direction, and characterized by such an arrangement and construction of the two disk valve means that the two disks thereof are disposed substantially transversely to the impinging flow from the filling cylinder means into the filling and discharge line means but are disposed approximately parallel to the reverse flow direction, the first and second disk valve means and the check valve means are combined into a single valve block and in that the first and second valve means are disposed substantially parallel to one another within the valve block while the check valve means is arranged in the valve block approximately at right angles thereto between the first and second valve means, the filling and discharge line means is so connected with the valve block that it terminates, even with a closed first disk means, at least with a predominate portion thereof above the disk of the first disk valve means, and in that in both the first and second disk valve means the connecting spaces to the filling cylinder means are extended above the valve seats by lateral pocket means and in that the filling and discharge line means terminates in the first valve means in the upwardly extended portion of the pocket means.

12. A retarder according to claim 11, characterized in that in the first valve means the valve seat is constructed as cylindrical pipe insert which is provided opposite to its seat with lateral openings leading into an annular housing space which, in its turn, intersects the space of the check valve means receiving the spring thereof.

13. A retarder according to claim 12, characterized in that the check valve means is a ball-check valve means, and in that in the second valve means the valve seat is constructed as cylindrical pipe insert which is provided opposite its seat with lateral openings leading into an annular space which, in its turn, is connected with the space below the ball of the check valve means and with the lubricating line means.

14. A retarder according to claim 13, characterized in that the valve block is directly coordinated to the filling cylinder means.

15. A retarder according to claim 13, characterized in that the valve block is formed itself by a housing portion of the filling cylinder means.

16. A retarder according to claim 15, characterized in that the external cooling circulatory system includes a cooler means.

17. A hydrodynamic retarder for vehicles which includes an internal working circulatory system between at least one rotating blade wheel means and at least one stationary blade wheel means in a working space, an external cooling circulatory system, a by-pass valve in the external cooling cirulatory system actuatable by the pressure thereof, a filling cylinder means operatively connected with the external cooling circulatory system by way of a filling and discharge line means, said filling cylinder means being selectively controlled by a control valve, a reservoir means operatively coordinated to the external cooling circulatory system, and pressure-relief means of the spaces disposed directly in front of shaft seals in the direction toward a place of the working circulatory system which is pressureless during operation, characterized in that a first spring-loaded valve means is operatively associated with the filling cylinder means, said first valve means being operable to close during a braking operation a connection between the filling and discharge line means and the reservoir means while opening a connection between the filling and discharge line means to the filling cylinder means, and said first valve means being additionally operable to open the connection between the filling cylinder means, the reservoir means and the filling and discharge line means during idling operation, and in that additionally a lubricating line means is provided between the pressure relieved spaces at the seals and the filling and discharge line means, the lubricating line means is operatively connected with the reservoir means by way of a check valve means, a second spring-loaded valve means being operatively connected in said lubricating line means, said second valve means being operable to close during a braking operation but opening during idling operation the connection between the lubricating line means and the filling and discharge line means, the first and second valve means and the check valve means are combined into a single valve block and in that the first and second valve means are disposed substantially parallel to one another within the valve block while the check valve means is arranged in the valve block approximately at right angle thereto between the first and second valve means, and in that in both the first and second valve means the connecting spaces to the filling cylinder means are extended above the valve seats by lateral pocket means and in that the filling and discharge line means terminates in the first valve means in the upwardly extended portion of the pocket means.

18. A hydrodynamic retarder for vehicles which includes an internal working circulatory system between at least one rotating blade wheel means and at least one stationary blade wheel means in a working space, an external cooling circulatory system, a by-pass valve in the external cooling circulatory system actuatable by the pressure thereof, a filling cylinder means operatively connected with the external cooling circulatory system by way of a filling and discharge line means, said filling cylinder means being selectively controlled by a control valve, a reservoir means operatively coordinated to the external cooling circulatory system, and pressure relief means of the spaces disposed directly in front of shaft seals in the direction toward a place of the working circulatory system which is pressureless during operation, characterized in that a first spring-loaded valve means is operatively associated with the filling cylinder means, said first valve means being operable to close during a braking operation a connection between the filling and discharge line means and the reservoir means while opening a connection between the filling and discharge line means to the filling cylinder means, and said first valve means being additionally operable to open the connection between the filling cylinder means, the reservoir means and the filling and discharge line means during idling operation, and in that additionally a lubricating line means is provided between the pressure relieved spaces at the seals and the filling and discharge line means, the lubricating line means is operatively connected with the reservoir means by way of a check valve means, a second spring-loaded valve means being operatively connected in said lubricating line means, said second valve means being operable to close during a braking operation but opening during idling operation the connection between the lubricating line means and the filling and discharge line means, the first and second valve means and the check valve means are combined into a single valve block and in that the first and second valve means are disposed substantially parallel to one another within the valve block while the check valve means is arranged in the valve block approximately at right angle thereto between the first and second valve means, and in that in the first valve means the valve seat is constructed as cylindrical pipe insert which is provided opposite to its seat with lateral openings leading into an annular housing space which, in its turn, intersects the space of the check valve means receiving the spring thereof.

19. A hydrodynamic retarder for vehicles which includes an internal working circulatory system between at least one rotating blade wheel means and at least one stationary blade wheel means in a working space, an external cooling circulatory system, a by-pass valve in the external cooling circulatory system actuatable by the pressure thereof, a filling cylinder means operatively connected with the external cooling circulatory system by way of a filling and discharge line means, said filling cylinder means being selectively controlled by a control valve, a reservoir means operatively coordinated to the external cooling circulatory system, and pressure-relief means of the spaces disposed directly in front of shaft seals in the direction toward a place of the working circulatory system which is pressureless during operation, characterized in that a first spring-loaded valve means is operatively associated with the filling cylinder means, said first valve means being operable to close during a braking operation a connection between the filling and discharge line means and the reservoir means while opening a connection between the filling and discharge line means to the filling cylinder means, said first valve means being additionally operable to open the connection between the filling cylinder means, the reservoir means and the filling and discharge line means during idling operation, and in that additionally a lubricating line means is provided between the pressure relieved spaces at the seals and the filling and discharge line means, the lubricating line means is operatively connected with the reservoir means by way of a check valve means, a second spring-loaded valve means being operatively connected in said lubricating line means, said second valve means being operable to close during a braking operation but opening during idling operation the connection between the lubricating line means and the filling and discharge line means, the first and second valve means and the check valve means are combined into a single valve block and in that the first and second valve means are disposed substantially parallel to one another within the valve block while the check valve means is arranged in the valve block approximately at right angle thereto between the first and second valve means, and in that the check valve means is a ball-check valve means and in that in the second valve means the valve seat is constructed as cylindrical pipe insert which is provided opposite its seat with lateral openings leading into an annular space which, in its turn, is connected with the space below the ball of the check valve means and with the lubricating line means.

20. A hydrodynamic retarder for vehicles which includes an internal working circulatory system between at least one rotating blade wheel means and at least one stationary blade wheel means in a working space, an external cooling circulatory system, a by-pass valve in the external cooling circulatory system actuatable by the pressure thereof, a filling cylinder means operatively connected with the external cooling circulatory system by way of a filling and discharge line means, said filling cylinder means being selectively controlled by a control valve, a reservoir means operatively coordinated to the external cooling circulatory system, and pressure-relief means of the spaces disposed directly in front of shaft seals in the direction toward a place of the working circulatory system which is pressureless during operation, characterized in that a first spring-loaded disk valve means is operatively associated with the filling cylinder means, said first valve means being operable to close during a braking operation a connection between the filling and discharge line means and the reservoir means while opening a connection between the filling and discharge line means to the filling cylinder means, and said first valve means being additionally operable to open the connection between the filling cylinder means, the reservoir means and the filling and discharge line means during idling operation, and in that additionally a lubricating line means is provided between the pressure-relieved spaces at the seals and the filling and discharge line means, the lubricating line means is operatively connected with the reservoir means by way of a check valve means, a second spring-loaded disk valve means being operatively connected in said lubricating line means, said second valve means being operable to close during a braking operation but opening during idling operation the connection between the lubricating line means and the filling and discharge line means, the first and second valve means and the check valve means are combined into a single valve block and in that the first and second valve means are disposed substantially parallel to one another within the valve block while the check valve means is arranged in the valve block at approximately a right angle thereto between said first and second valve means, the filling and discharge line means is so connected with the valve block that it terminates, even with a closed first disk means, at least with a predominate portion thereof above the disk of the first valve means, and in that in both the first and second valve means the connecting spaces to the filling cylinder means are extended above the valve seats by lateral pocket means and in that the filling and discharge line means terminates in the first valve means in the upwardly extended portion of the pocket means.

21. A hydrodynamic retarder for vehicles which includes an internal working circulatory system between at least one rotating blade wheel means and at least one stationary blade wheel means in a working space, an external cooling circulatory system, a by-pass valve in the external cooling circulatory system actuatable by the pressure thereof, a filling cylinder means operatively connected with the external cooling circulatory system by way of a filling and discharge line means, said filling cylinder means being selectively controlled by a control valve, a reservoir means operatively coordinated to the external cooling circulatory system, and pressure-relief means of the spaces disposed directly in front of the shaft seals in the direction toward a place of the working circulatory system which is pressureless during operation, characterized in that a first spring-loaded disk valve means is operatively associated with the filling cylinder means, said first valve means being operable to close during a braking operation a connection between the filling and discharge line means and the reservoir means while opening a connection between the filling and discharge line means to the filling cylinder means, and said first valve means being additionally operable to open the connection between the filling cylinder means, the reservoir means and the filling and discharge line means during idling operation, and in that additionally a lubricating line means is provided between the pressure-relieved spaces at the seals and the filling and discharge line means, the lubricating line means is operatively connected with the reservoir means by way of a check valve means, a second spring-loaded disk valve means being operatively connected in said lubricating line means, said second valve means being operable to close during a braking operation but opening during idling operation the connection between the lubricating line means and the filling and discharge line means, the first and second valve means and the check valve means are combined into a single valve block and in that the first and second valve means are disposed substantially parallel to one another within the valve block while the check valve means is arranged in the valve block at approximately at right angle thereto betweeen said first and second valve means, the filling and discharge line means is so connected with the valve block that it terminates, even with a closed first disk means, at least with a predominate portion thereof above the disk of the first valve means, and in that in the first valve means the valve seat is constructed as cylindrical pipe insert which is provided opposite to its seat with lateral openings leading into an annular housing space which, in its turn, intersects the space of the check valve means receiving the spring thereof.

22. A hydrodynamic retarder for vehicles which includes an internal working circulatory system between at least one rotating blade wheel means and at least one stationary blade wheel means in a working space, an external cooling circulatory system, a by-pass valve in the external cooling circulatory system actuatable by the pressure thereof, a filling cylinder means operatively connected with the external cooling circulatory system by way of a filling and discharge line means, said filling cylinder means being selectively controlled by a control valve, a reservoir means operatively coordinated to the external cooling circulatory system, and pressure-relief means of the spaces disposed directly in front of shaft seals in the direction toward a place of the working circulatory system which is pressureless during operation, characterized in that a first spring-loaded disk valve means is operatively associated with the filling cylinder means, said first valve means being operable to close during a braking operation a connection between the filling and discharge line means and the reservoir means while opening a connection between the filling and discharge line means to the filling cylinder means, and said first valve means being additionally operable to open the connection between the filling cylinder means, the reservoir means and the filling and discharge line means during idling operation, and in that additionally a lubricating line means is provided between the pressure relieved spaces at the seals and the filling and discharge line means, the lubricating line means is operatively connected with the reservoir means by way of a check valve means, a second spring-loaded disk valve means being operatively connected in said lubricating line means, said second valve means being operable to close during a braking operation but opening during idling operation the connection between the lubricating line means and the filling and discharge line means, the first and second valve means and the check valve means are combined into a single valve block and in that the first and second valve means are disposed substantially parallel to one another within the valve block while the check valve means is arranged in the valve block at approximately a right angle thereto between said first and second valve means, the filling and discharge line means is so connected with the valve block that it terminates, even with a closed first disk means, at least with a predominate portion thereof above the disk of the first valve means, and in that the check valve means is a ball-check valve means, and in that in the second valve means the valve seat is constructed as cylindrical pipe insert which is provided opposite its seat with lateral openings leading into an annular space which, in its turn, is connected with the space below the ball of the check valve means and with the lubricating line means.

* * * * *